United States Patent
Suzuki et al.

(10) Patent No.: US 12,043,334 B2
(45) Date of Patent: Jul. 23, 2024

(54) REARVIEW MIRROR-TYPE FRONT/REAR INTEGRATED SIMULTANEOUS IMAGE RECORDING APPARATUS FOR MOTORCYCLES

(71) Applicant: PITGARAGEDUCT INCORP, Nagoya (JP)

(72) Inventors: Naoki Suzuki, Nagoya (JP); Motohiro Funahashi, Nagoya (JP)

(73) Assignee: PITGARAGEDUCT INCORP, Nagoya (JP)

( * ) Notice: Subject to any disclaimer, the term of this patent is extended or adjusted under 35 U.S.C. 154(b) by 0 days.

(21) Appl. No.: 18/268,245

(22) PCT Filed: Jan. 5, 2021

(86) PCT No.: PCT/JP2021/000059
§ 371 (c)(1),
(2) Date: Jun. 19, 2023

(87) PCT Pub. No.: WO2022/149180
PCT Pub. Date: Jul. 14, 2022

(65) Prior Publication Data
US 2024/0051634 A1    Feb. 15, 2024

(51) Int. Cl.
*B62J 29/00* (2006.01)
(52) U.S. Cl.
CPC ..................... *B62J 29/00* (2013.01)
(58) Field of Classification Search
CPC ....................................... B62J 29/00
(Continued)

(56) References Cited

U.S. PATENT DOCUMENTS 6,795,111 B1 * 9/2004 Mazzilli ............. G08B 13/1965
                                                            348/148
10,836,319 B1 * 11/2020 Baylark ................. B60R 11/04
(Continued)

FOREIGN PATENT DOCUMENTS

CN          202011361 U       10/2011
CN          206598927 U       10/2017
(Continued)

OTHER PUBLICATIONS

International Search Report for PCT/JP2021/000059 dated Apr. 20, 2021.
(Continued)

*Primary Examiner* — Ricky D Shafer
(74) *Attorney, Agent, or Firm* — Yokoi & Co., U.S.A.; Toshiyuki Yokoi

(57) ABSTRACT

To provide a rearview mirror-type front/rear simultaneous video recording device for Motorcycles, etc. that does not spoil the appearance of the vehicle, with a function inside the rearview mirror housing that enables simultaneous recording of the front and rear views of the vehicle, while eliminating the complicated wiring process that can otherwise cause hesitation to use it. As a tool to promote more useful use, a waterproof video recording device body, in which a control unit for recording images and sound recording means and information communication functions are installed inside the rearview mirror housing, and two cameras for taking front and rear images are built in. The shape of the housing can be selected from either a rearview mirror with a built-in camera lens or that with an exposed lens, and the video recording device can be installed quickly and easily without any wiring other than for the power supply.

1 Claim, 5 Drawing Sheets

(58) Field of Classification Search
USPC .......................................................... 359/842
See application file for complete search history.

(56) References Cited

U.S. PATENT DOCUMENTS

| | | | | |
|---|---|---|---|---|
| 2002/0011927 | A1* | 1/2002 | Lang | B60R 1/00 |
| | | | | 340/436 |
| 2004/0143373 | A1* | 7/2004 | Ennis | B60R 1/00 |
| | | | | 701/1 |
| 2006/0170770 | A1* | 8/2006 | MacCarthy | B60R 25/302 |
| | | | | 348/148 |
| 2008/0204556 | A1* | 8/2008 | de Miranda | G08B 13/19645 |
| | | | | 348/148 |
| 2010/0328463 | A1* | 12/2010 | Haler | H04N 23/50 |
| | | | | 348/148 |
| 2011/0115911 | A1* | 5/2011 | Fang | B60R 1/04 |
| | | | | 348/148 |
| 2014/0118855 | A1* | 5/2014 | Whinnery | B62J 29/00 |
| | | | | 359/842 |
| 2016/0155476 | A1 | 6/2016 | Fang | |
| 2016/0241816 | A1 | 8/2016 | Noguchi et al. | |
| 2018/0032822 | A1* | 2/2018 | Frank | H04N 13/20 |
| 2020/0339038 | A1* | 10/2020 | Brett | B60R 1/08 |
| 2020/0407003 | A1* | 12/2020 | Fukuoka | G06V 20/59 |
| 2022/0203898 | A1* | 6/2022 | Warren | B60R 1/12 |

FOREIGN PATENT DOCUMENTS

| | | |
|---|---|---|
| JP | 2005-077107 A | 3/2005 |
| JP | 2010-281691 A | 12/2010 |
| JP | 2016-103257 A | 6/2016 |
| JP | 2017-154653 A | 9/2017 |
| JP | 2018-052459 A | 4/2018 |
| JP | 2019-001301 A | 1/2019 |
| JP | 2020-145687 A | 9/2020 |
| WO | 2015/049792 A | 4/2015 |

OTHER PUBLICATIONS

International Preliminary Report on Patentability for PCT/JP2021/000059 dated Dec. 26, 2022.
Japanese decision to grant a patent dated Apr. 25, 2023.
Japanese notice of reason for refusal dated Apr. 4, 2023.
Japanese notice of reason for refusal dated Mar. 14, 2023.

* cited by examiner

The figure illustrates a camera embedded type (cowl-mounted type) front/rear integrated simultaneous video recording device pertaining to this invention.

The figure illustrates the simultaneous video recording device of the camera-embedded type (naked type, moped type) front/rear integrated type pertaining to this invention.

REARVIEW MIRROR-TYPE FRONT/REAR INTEGRATED SIMULTANEOUS IMAGE RECORDING APPARATUS FOR MOTORCYCLES

TECHNICAL FIELD

This invention relates to an image recording device, which can be suitably used as a drive recorder or action camera to be mounted on motorcycles and motor-tricycles, motorcycles with side-wheels, and motorized bicycles (hereinafter referred to as "Motorcycles, etc.").

BACKGROUND ART

Patent Literature 1, for example, states, "The first camera 26 and the second camera 27 are arranged back-to-back and are fixed and connected so that they each take pictures in opposite directions to form a camera unit 35. The camera unit 35 is integrated by erecting a flat rectangular-shaped holder 36 and fixing the first camera 26 on its front side and the second camera 27 on its rear side. The fixing thereof is done, for example, by means of screws."

Patent Literature 2, for example, states, "By having a pipelike or U-shaped or C-shaped cross sectional body frame 18 of a motorcycle and placing a camera 100 in an end 18a of the body frame 18 that is opened in the longitudinal direction, the body frame 18 can wrap the camera 100 placed in the end 18a to effectively protect the camera 100 and prevent its damage, etc."

Patent Literature 3 states, "Since the camera includes a first camera that captures the driver's facial expressions and the storage device stores the vehicle environment information in association with the video image of the first camera, the driver's movements and facial expressions can be captured by the first camera and the captured video image can be stored in association with the vehicle environment, allowing the driver's image to be viewed in correspondence with the vehicle environment information. Therefore, users can experience the situation of the driver and the vehicle more realistically compared to simply viewing only the driver's video. Therefore, it is possible to deepen interest in the driver and the vehicle, etc. Also, since the vehicle environment information is the video information in front of the vehicle captured by the second camera, by associating and storing the video information in front of the vehicle with the driver's movements and facial expressions, the driver's condition corresponding to the vehicle driving area and vehicle driving condition can be grasped from the associated information."

Patent Literature 4 states, "After the rear view camera is mounted on the vehicle, the rotation shift around the optical axis of the camera is measured by adjusting the relative position of a real pattern consisting of two rotation adjustment targets placed on the ground on a line perpendicular to the desired camera optical axis passing through the point where the desired camera optical axis intersects the ground, and the rotation adjustment display pattern on the display screen including two points on a horizontal line passing through the center of the display screen. Also, the shift in the camera's optical axis orientation is measured by adjusting the by adjusting the relative position on the display screen between the actual pattern consisting of the position adjustment target that is farther from the vehicle than the position of the rotation adjustment target on the ground and the position adjustment screen display pattern located above the position of the rotation adjustment screen display pattern on the screen."

Patent Literature 5 states, "Drive recorders have advanced significantly in function and technology over the years as technology has evolved. The most important function of a drive recorder installed in a vehicle is that it can store video and audio recordings on a recording medium, so it is employed to monitor driving conditions and as evidence of responsibility in the event of an accident, and drive recorders are spreading at an accelerating pace due to their usefulness."

Patent Literature 6 states, "An electronic mirror device that incorporates a display device (e.g., liquid crystal display) that displays the rearward view of the vehicle captured by a camera and can provide the driver with a clear rearward view in various driving environments has been put to practical use. This type of electronic mirror device has a magic mirror (one-way mirror) that reflects part of the incident light and transmits part of it, and a display device is placed on the rear side of the magic mirror. In order to ensure visibility of the magic mirror and display device, the electronic mirror device can also change the tilt angle of the display surface according to the on/off state of the display device."

The purpose of this invention is not limited to this, but is to obtain the effect produced from the portion of the composition disclosed in this Description and the drawings, etc., and the applicant of the present application has the intention to make a portion of the composition described in this Description the scope of the claims by an amendment or divisional application.

CITATION LIST

PATENT LITERATURE

| | |
|---|---|
| PTL1 Unexamined patent application | 2020-145687 |
| PTL2 Unexamined patent application | 2019-001301 |
| PTL3 Republished patent application | 2015-049792 |
| PTL4 Unexamined patent application | 2005-77107 |
| PTL5 Unexamined patent application | 2016-103257 |
| PTL6 Unexamined patent application | 2018-052459 |

SUMMARY OF INVENTION

Technical Problem

Although video recording devices are becoming more widespread, in the case of Motorcycles, etc., there is no end to the number of cases of traffic accidents in which responsibility is unclear, and the number of traffic accidents resulting in high compensation due to various types of accidents is also on the rise. In addition, while it is useful for assisting accident victims, video recording has been recognized as an object of liking in recent years. However, it is necessary to perform complicated wiring processes when taking video of vehicles, especially Motorcycles, etc. and it is not convenient to install video recording devices, so it is difficult to benefit from video recording devices as they should be.

In the Patent Literature 2, described in the Background Art, it is described that the camera body is installed inside the vehicle frame as if it is wrapped to prevent the camera body from being damaged, but from that location, the required angle of view is rarely obtained, and the wiring process remains complicated because the rear-view camera to be installed is a separate unit.

Also, although the Patent Literature 2 describes that "by associating and storing image information of the front of the vehicle with the driver's actions and facial expressions, it is possible to grasp the driver's condition corresponding to the vehicle driving area and vehicle driving condition from the associated information," the focus is on associating image information of the front of the vehicle with the driver's actions and facial expressions, and the range of the angle of view obtained from the shooting location in the rear of the vehicle in particular is limited. Patent Literature 7 describes a "rear view checking device with camera" that mainly takes pictures through something like a half-mirror, but when a half-mirror is used, a clear image cannot be obtained because the mirror surface itself is distorted, the proper angle sought by the user cannot be obtained because it has no dust-proof function or picture angle adjustment function, and it is limited in versatility when mounted, so it is not very practical.

At present, there are front/rear integrated drive recorders for use in the cabin of four-wheeled vehicles, as described in Patent Literature 1, but there is no waterproof, front/rear integrated simultaneous video recording apparatus that can be powered directly from DC12 V supplied from the generator of Motorcycles, etc. that can record images at all times. The present invention has been made in view of such circumstances, and aims to provide a video recording apparatus equipped with functions useful as a tool to promote easier use, thereby enabling users of Motorcycles, etc. to break free from the complicated wiring required in the conventional usage environment.

Solution to Problem

This invention is characterized by the fact that it is a video recording device with excellent usability, as it eliminates the complicated wiring processes that cause users of Motorcycles, etc. to hesitate using the device, and can secure the required angle of view and video information by placing cameras for front and rear photography in the rearview mirror, and can be used simply by wiring the power supply, allowing users themselves to install the device more easily and quickly.

In order to achieve the above-mentioned purpose, the invention described in claim 1 is characterized by adopting a structural form that integrates the front and rear cameras into the rearview mirror housing, while having a microphone input unit that records audio and a function to record images taken by the front and rear imaging means onto a recording medium, as a means to obtain necessary and sufficient video and audio information, which can be used for vehicles with power generation functions, such as Motorcycles, etc. by simply processing the wiring for the power source.

In addition, the invention as shown in the figures are designed to perform constant recording, and is characterized by a structure in which the lens part of the rear camera is exposed from the mirror surface and the front camera is built into the housing except for the camera lens part, so as not to spoil the exterior appearance of the vehicle.

Advantageous Effects of Invention

When taking front/rear video with Motorcycles, etc., it used to be necessary to perform complicated wiring processing involving four or more wires, but this invention can be easily installed by eliminating the wiring processing as much as possible, which can cause users of Motorcycles, etc. to hesitate to use it, thus further responding to the needs to "preserve video evidence in case of an accident" as a means of self-preservation, as well as to the improvement of safe driving awareness. In addition, the rear-view mirror-type front/rear integrated simultaneous video recording device provided by this invention can be utilized in the field of drive recorders and action cameras as a useful social resource, since it has applications not only as a functional component but also as a more familiar recreational item, such as having a taste element to "record everyday life" as if taking pictures, which is seen also in multi-function mobile terminals.

DESCRIPTION OF EMBODIMENTS

The following description of the embodiment of the invention is based on the examples of embodiments of the invention shown in the accompanying drawings. These drawings are used to illustrate the technical features that may be employed by the invention.

The configuration, shape, etc. of the described device is merely an illustrative example, and the invention is not to be construed as limited thereto, but may be subject to various changes, modifications, and improvements based on the applicant's knowledge, to the extent not departing from the scope of the invention.

Figure 1:
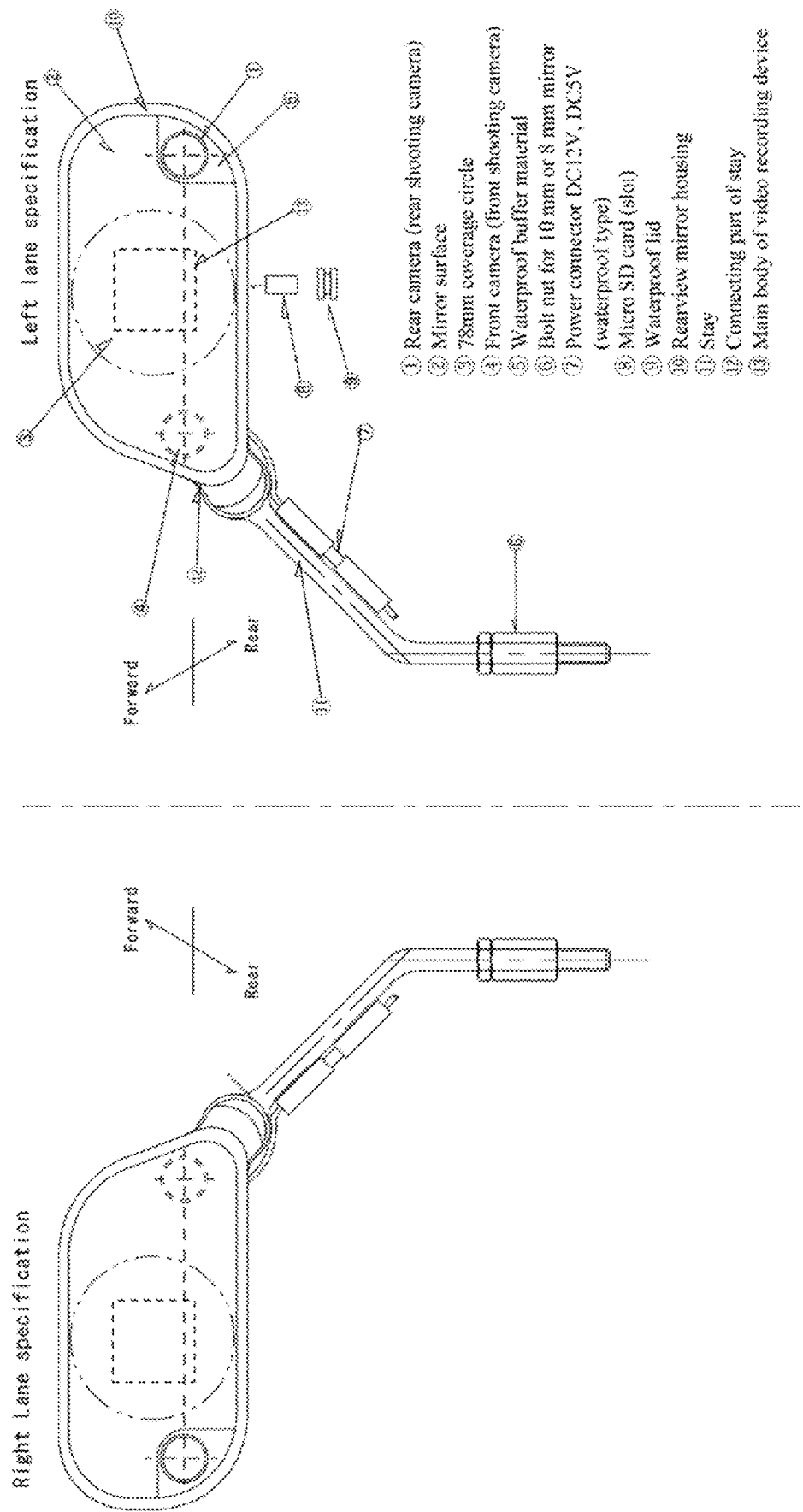
FIG. 1 The figure illustrates the camera-exposed (naked type, moped type) front/rear integrated simultaneous video recording device pertaining to this invention.
Figure 2:
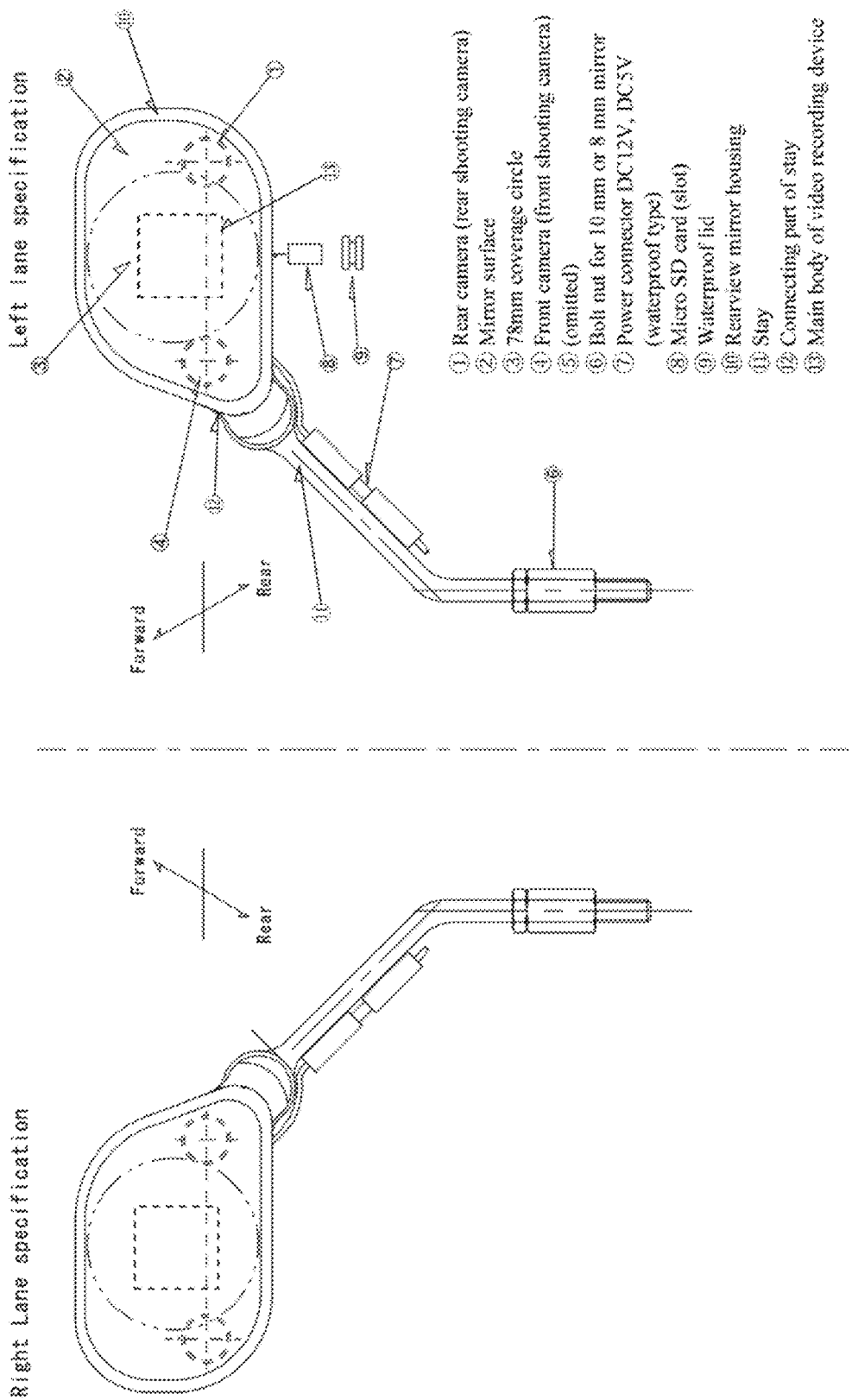
FIG. 2 The figure illustrates the simultaneous video recording device of the camera-embedded type (naked type, moped type) front/rear integrated type pertaining to this invention.
Figure 3:
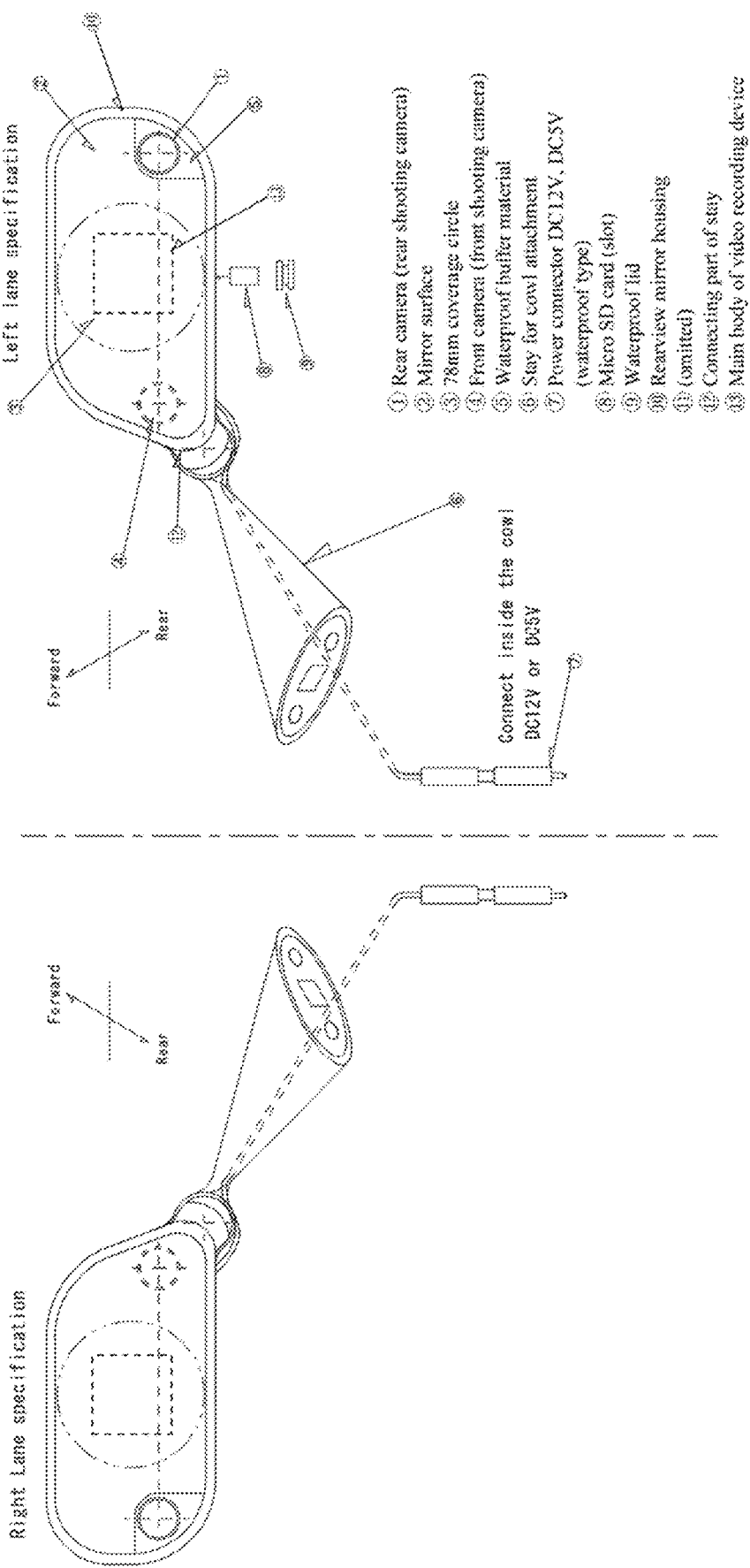
FIG. 3 The figure illustrates the camera-exposed type (cowl-mounted type) front/rear integrated simultaneous video recording device pertaining to this invention.

(1) The rearview mirror-type video recording device of this form shown in FIGS. 1 to 3 illustrates the outline drawing of a suitable embodiment. They are classified as naked type, motorized bicycle type, and cowl-mounted type, and their use is divided into those for the right lane and those for the left lane, which can be arbitrarily selected as either left or right, since this device is intended for users not only in Japan but also in other countries where traffic zones are different from those in Japan.

(2) In the Patent Literature 4, images captured by the camera unit and imported into the recording unit can be viewed on an LCD monitor. However, if the vehicle and driving conditions can be viewed more realistically by using a multifunctional mobile terminal or other device, it is possible to arouse interest in the vehicle and driver's situation. With the video recording device of this invention, the recorded image of the rear shown by the rear camera 1 in FIGS. 1 to 3 shows the driver's own image, which enables more realistic reproduction of the situation on the spot, and can also be used for a recreational application where the image can be checked casually according to the use.

(3) The rear-view mirror-type front/rear integrated simultaneous video recording system shown in FIGS. 1 to 3 is compatible with the vehicle inspection system (automobile inspection and registration system) of Japan, but may be flexibly adapted according to the traffic classification of other countries. When mounted on vehicles such as Motorcycles, etc., the mirror meets the standards set forth in Section 224 (rearview mirrors, etc.) of the Notification that prescribes detailed safety standards for road vehicles. In the case of Japan, for example, noting that the safety standards for rearview mirrors of motorcycles have been changed, for all vehicles manufactured on or after Jan. 1, 2007, and for all rearview mirrors for vehicles with type approval on or after Jan. 1, 2005, the area of the mirror surface to be used shall be 69 square centimeters or more, and for circular items, the size of the mirror surface shall be 94 mm or more and 150 mm or less in diameter. In the case of an external shape other than circular (e.g., square or oval), the mirror surface is less than 120×200 mm (or 200×120 mm) in size and can conceal a circle of 78 mm in diameter, thus satisfying all safety standards.

(4) The rearview mirror-type video recording device shown in FIGS. 1 to 3 is equipped with a video recording main unit A shown in FIGS. 1 to 5, which executes various processes inside its housing, a front-facing camera 4 and a rear-facing camera 1 shown in FIGS. 1 to 2, and the main unit and cameras have waterproof functions. The voice input is used, for example, to collect and record sounds before and after a collision or the driver's voice in the event of an accident. However, if the user wants to record voice from any location, for example, a microphone with an external input function may be used to record the user's voice.

(5) The front-facing camera 4 and the rear-facing camera 1 shown in FIGS. 1 and 2, are placed in the effective space inside the housing To avoid spoiling the original appearance of the vehicle and to comply with Japan's vehicle inspection (automobile inspection and registration system), the front-facing camera 4 in FIGS. 1 and 2 is placed within the same plane as the housing to prevent the tip of the lens from protruding.

(6) The cameras used in this video recording device employ a wide-angle lens, can record the images they capture, and have a function to output the recorded video information. These two cameras are integrated in the housing as shown in FIG. 1 to FIG. 3, and have the function of simultaneously capturing a wide range of images, necessary and sufficient for both the front and rear.

(7) The cameras built into the housing of the rearview mirror-type video recorder shown in FIGS. 1 to 3 are generally located in the positions shown in the figures so that the video recording main device A shown in FIGS. 1 to 3 does not interfere with them inside the housing. The front camera section shown by camera 4 for the rearward direction in FIGS. 1 to 3 is arranged to bring the angle of view closer to the driver's line of sight by placing it close to the connecting part of the stay where it is mounted so that it does not affect the range of the forward-facing images. The mirror-side photographing section for photographing rearward, shown by camera 1 in FIG. 1 to FIG. 3, has a camera lens at the outer end of the housing to ensure a good view of the rearward photographing record and to allow the driver to check the driver's situation.

(8) In the case of adopting the rearview mirror-type video recording device of the invention, the rear viewing camera 1 and front-viewing camera 4 shown in FIGS. 1 and 2 not only have a function to adjust and fix the shooting direction, but also are designed to be flush with the housing as much as possible so that the tip of the lens does not protrude significantly, and by providing joint inspection port, the ball joint part can be easily adjusted, and the ball joint nut can be made a common part for naked and cowl types, and it is also possible to respond to defects.

(9) In the case of adopting the rearview mirror-type video recording device 1 of the invention, the rearward camera 1 shown in FIGS. 1 to 3 is not only equipped with a function to fix the shooting direction, but is also installed so that the lens [part] portion of the rearward shooting camera is exposed, The shooting camera is built into the rearview mirror housing located on the outer edge of mirror surface 2 shown in FIGS. 1 to 3, with part of the camera lens exposed, so as not to spoil the original appearance of the vehicle. The front photography section shown in FIGS. 1 and 2 with the front-facing shooting camera 4 is designed to be built into the housing, except for the camera lens section.

(10) The recording medium for recording images employed in this video recording device is a micro SD card, or the like, since there is little possibility of physical damage to the recording medium itself, which is built into the main body of the recording device, even if the camera is damaged due to a fall or other impact. In such a case, in the rearview mirror-type video recording device of the present invention, the card slot, which is the storage location for the video recording medium shown in FIG. 1 and FIG. 2 at micro SD card (slot) 8, is mounted on the bottom side of the rearview mirror. The micro SD card slot section is designed to use the waterproof and dustproof lid 9 shown in FIGS. 1 and 2 to ensure that water and dust are prevented from entering the slot.

(11) The method of supplying electricity to the video recording device is by connecting it to the attached waterproof power connector 7 shown in FIG. 1 and FIG. 2. In this case, there are two methods of supplying electricity: one is to connect the power line attached to the device to a DC12V power source installed in the vehicle or a DC5V power source from a mobile battery or USB port, and the other is to use a simple storage battery that continues recording for a certain period of time after the power is shut off. The waterproof power connector 7 shown in FIG. 1 and FIG. can be exposed on the outside of the housing to allow power supply, or it can be connected directly to the housing. The cowl-type video recording device shown in 3 employs a method of extending the wiring of the power connector into the cowl and connecting it inside the cowl to supply power, in which case the cowl mounting stay 6 shown in FIG. 3 is connected to a mounting hole already existing on the Motorcycle, etc.

(12) As a function to be incorporated in this invention, for example, the images simultaneously captured by the camera 4 for the forward direction and the camera 1 for the rear direction shown in FIG. 1 and FIG. 2, respectively, can be set and displayed in the required operation settings by using a dedicated application program with a multi-function mobile terminal or the like, and should have a function to display a reference screen and adjust the angle of view by various operations and to manage video records.

(13) The wireless network communication device used in this invention is satisfied by [WIFI] (registered trademark), [LTE] (registered trademark), or short-range wireless communication [Blue tooth (registered trademark)] method, etc., and the application method of saving a copy of the recorded video of the drive recorder taken during driving to cloud storage can also be adopted.

(14) For the rearview mirror-type video recording device shown in FIGS. 1 to 3, in order to enable users of Motorcycles, etc. to easily use the rearview mirror of this form, bolt nuts 6 for 10 mm or 8 mm mirrors shown in FIGS. 1 and 2 are selected according to the diameter compatible with the motorcycle being used to mount and fix the rearview mirror-type. Also, it can be easily used for cowl-mounted type in the same way, and is fixed using the stay existing on the motorcycle being used.

(15) The installation method of the rearview mirror-type video recording device of this invention is to install the rearview mirror with built-in video recording device on the vehicle according to the normal replacement procedure, and to supply power after fixing the shooting direction of the means of photography.

REFERENCE SIGNS LIST

Figure 4:
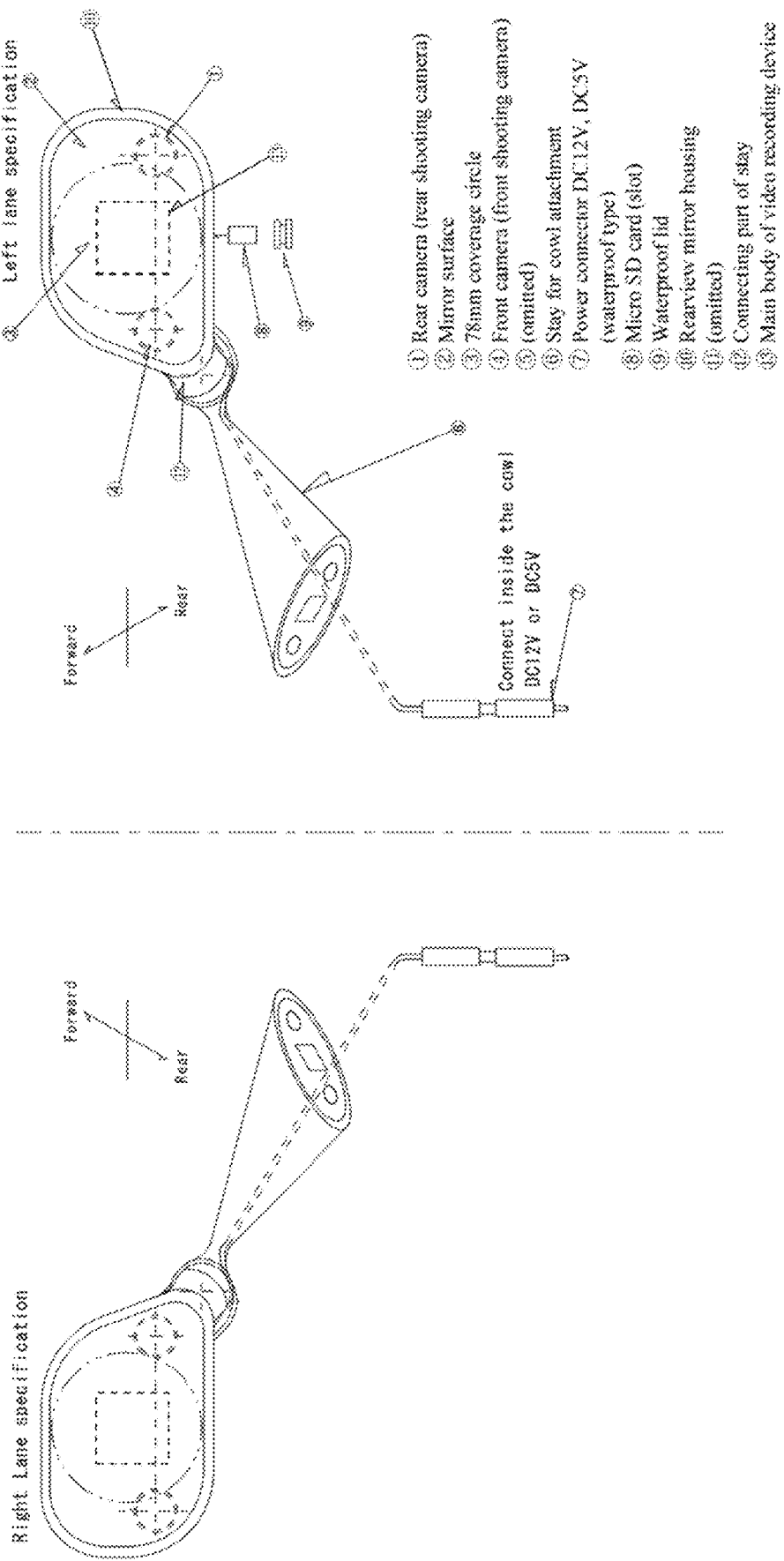
FIG. 4 The figure illustrates a camera embedded type (cowl-mounted type) front/rear integrated simultaneous video recording device pertaining to this invention.
Figure 5:
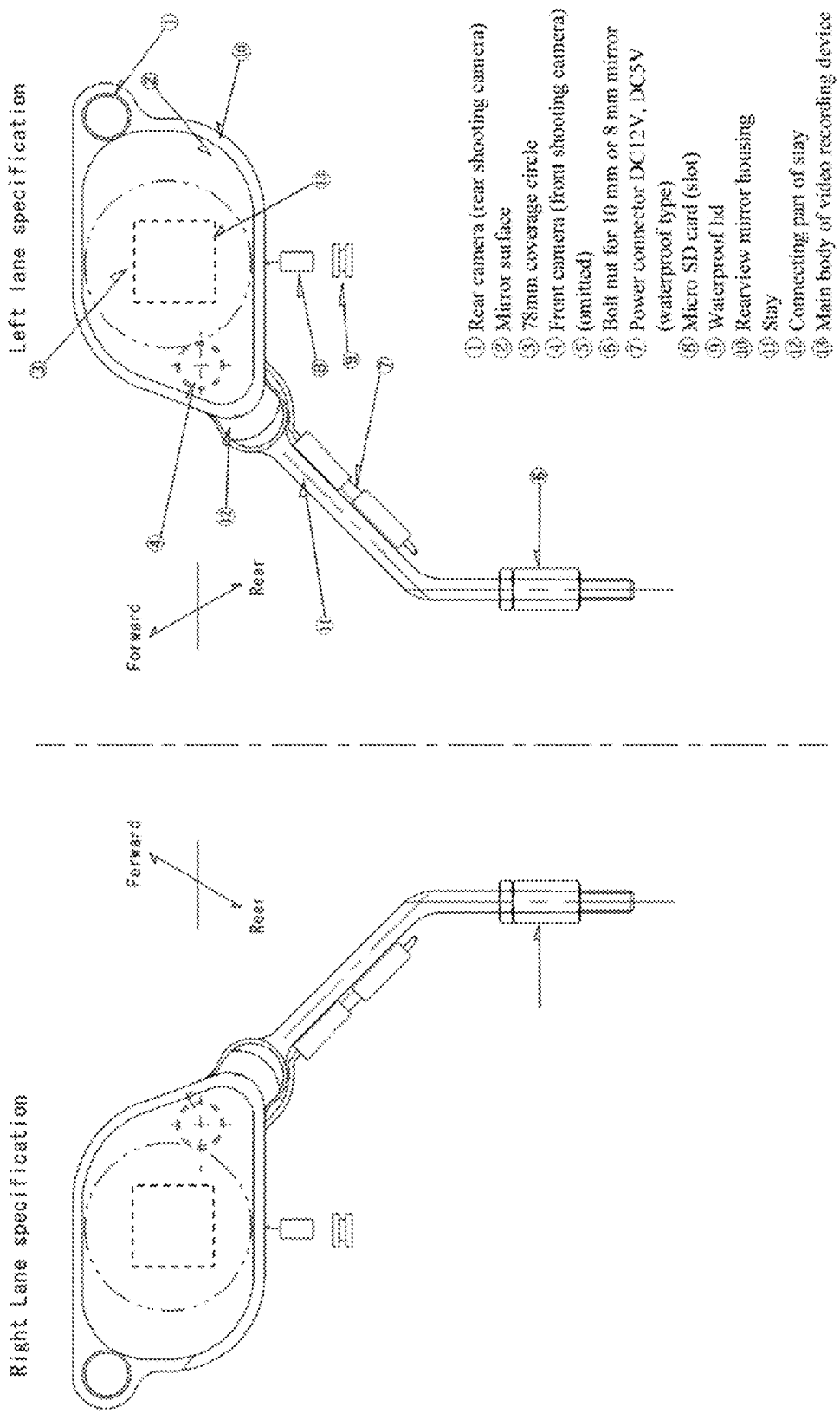
FIG. 5 The figure illustrates a front/rear integrated simultaneous video recording device of the camera-embedded type (naked type, moped type, cowl-mounted type) that changes the external appearance of the rear-view mirror pertaining to this invention.

FIG. 1
 1 Rear camera
 2 Mirror surface
 3 78 mm coverage circle
 4 Front camera
 5 Waterproof buffer material
 6 Bolt nut for 10 mm or 8 mm mirror
 7 Power connector DC12V, DC5V (waterproof type)
 8 Micro SD card (slot)
 9 lid Waterproof lid
 A Video recording device FIG. 2
 1 Rear camera
 2 Mirror surface
 3 78 mm coverage circle
 4 Front camera
 5 (omitted)
 6 Bolt nut for 10 mm or 8 mm mirror
 7 Power connector DC12V, DC5V (waterproof type)
 8 Micro SD card (slot)
 9 Waterproof lid
 A Video recording device FIG. 3
 1 Rear camera
 2 Mirror surface
 3 78 mm coverage circle
 4 Front camera
 5 Waterproof buffer material
 6 Stay for cowl attachment
 7 Power connector DC12V, DC5V (waterproof type)
 8 Micro SD card (slot)
 9 Waterproof lid
 A Video recording device FIG. 4
 1 Rear camera
 2 Mirror surface
 3 78 mm coverage circle
 4 Front camera
 5 (omitted)
 6 Stay for cowl attachment
 7 Power connector DC12V, DC5V (waterproof type)
 8 Micro SD card (slot)
 9 Waterproof lid
 A Video recording device FIG. 5
 1 Rear camera
 2 Mirror surface
 3 78 mm coverage circle
 4 Front camera
 5 (omitted)
 6 Bolt nut for 10 mm or 8 mm mirror
 7 Power connector DC12V, DC5V (waterproof type)
 8 Micro SD card (slot)
 9 Waterproof lid
 A Video recording device

The invention claimed is:

1. A waterproof, front/rear simultaneous and continuous video recording apparatus for use with motorcycles, motorized tricycles, side-wheeled motorcycles, and motorized bicycles, which consists of a main body of a video recording device that records video and audio, a front shooting camera, and a rear shooting camera inside a rearview mirror housing, and is characterized in that the front shooting camera and the rear shooting camera do not overlap when viewed in a front/rear direction, and are arranged so that they do not protrude locally on a periphery of a rearview mirror housing, the front shooting camera is arranged close to a connecting part of a stay which exists on the motorcycles, the motorized tricycles, the side-wheeled motorcycles, and the motorized bicycles to mount the rearview mirror housing on the motorcycles, the motorized tricycles, the side-wheeled motorcycles, and the motorized bicycles, the rear shooting camera is arranged on an outer end of the rearview mirror housing, the front shooting camera and the rear shooting camera have a function to adjust an angle of view and a function to fix a shooting direction, a slot for a video recording medium is mounted on a bottom side of the rearview mirror housing and a waterproof lid is provided on the slot, an electricity is supplied to the video recording device, the front shooting camera and the rear shooting camera by a waterproof power connector exposed on an outside of the rearview mirror housing, and the rearview mirror housing is fixed to the motorcycles, the motorized tricycles, the side-wheeled motorcycles, and the motorized bicycles using the stay.

* * * * *